(12) United States Patent
Neto et al.

(10) Patent No.: US 11,442,161 B2
(45) Date of Patent: Sep. 13, 2022

(54) SATELLITE BORNE SYNTHETIC APERTURE RADAR

(71) Applicant: Embraer S.A., São José dos Campos-SP (BR)

(72) Inventors: João Roberto Moreira Neto, São José dos Campos (BR); Janio Kono, São José dos Campos (BR)

(73) Assignee: Embraer S.A., São José Dos Campos-Sp (BR)

( * ) Notice: Subject to any disclaimer, the term of this patent is extended or adjusted under 35 U.S.C. 154(b) by 248 days.

(21) Appl. No.: 16/577,670

(22) Filed: Sep. 20, 2019

(65) Prior Publication Data

US 2021/0088651 A1    Mar. 25, 2021

(51) Int. Cl.
| | |
|---|---|
| *G01S 13/90* | (2006.01) |
| *H01Q 1/08* | (2006.01) |
| *H01Q 1/28* | (2006.01) |
| *G01S 7/03* | (2006.01) |
| *G01S 13/02* | (2006.01) |

(52) U.S. Cl.
CPC ............ *G01S 13/90* (2013.01); *G01S 7/03* (2013.01); *H01Q 1/081* (2013.01); *H01Q 1/288* (2013.01); *G01S 2013/0263* (2013.01)

(58) Field of Classification Search
None
See application file for complete search history.

(56) References Cited

U.S. PATENT DOCUMENTS

| | | | |
|---|---|---|---|
| 5,642,122 A * | 6/1997 | Lockie ................. | H01Q 25/00 343/881 |
| 9,391,373 B2 | 7/2016 | Ehrenberg et al. | |
| 10,170,843 B2 | 1/2019 | Thomson et al. | |
| 10,199,711 B2 * | 2/2019 | Walker ................. | H01Q 1/288 |
| 2019/0025422 A1 * | 1/2019 | Edinger ................ | G01S 13/90 |
| 2020/0378372 A1 * | 12/2020 | Liang ................... | B64G 1/428 |
| 2021/0013581 A1 * | 1/2021 | Mast ..................... | H01Q 1/1235 |

OTHER PUBLICATIONS

Alberto Moreira, Synthetic Aperture Radar (SAR): Principles and Applications, Jul. 1-5, 2013. (Year: 2013).*
W.F. Williams, RF Design and Predicted Performance for a Future 34-Meter Shaped Dual-Reflector Antenna System Using the Common Aperture X-S Feedhorn. Jan.-Mar. 1983. (Year: 1983).*

* cited by examiner

*Primary Examiner* — Vladimir Magloire
*Assistant Examiner* — Artem Melkunov
(74) *Attorney, Agent, or Firm* — Nixon & Vanderhye P.C.

(57) ABSTRACT

The example non-limiting technology herein provides a Synthetic Aperture Radar (SAR) solution on board a microsatellite that provides global revisit within 1 month; a cost below US$ 10 million; and satellite mass lower than 100 kg. One solution uses an inflatable Cassegrain type antenna with a phased beam steering array in the 1.2 GHz band.

13 Claims, 4 Drawing Sheets

SATELLITE BORNE SYNTHETIC APERTURE RADAR

CROSS-REFERENCE TO RELATED APPLICATIONS

None.

STATEMENT REGARDING FEDERALLY SPONSORED RESEARCH OR DEVELOPMENT

None.

FIELD

This technology relates to imaging radar and low orbit satellites, and more particularly to low cost orbital platforms having a SAR radar system using a steerable antenna array coupled to an inflatable Cassegrain antenna.

BACKGROUND

When visiting an airport, you may have seen very large dish antennas aimed at the sky. These dish antennas are used for RADAR (radio detection and ranging). In a RADAR system, an antenna emits a microwave (ultra-high frequency radio transmission) pulse. When the emitted microwaves strike an object, some of the microwaves are reflected back to the emitting antenna (this is called "backscatter"). Receiving backscatter indicates that an object is in the path of the microwave pulse. Because the speed of light is known, the RADAR system is able to determine the "range" (distance) of the object from the antenna by determining when the backscatter arrives back at the antenna relative to when the original pulse was emitted.

An important parameter of any imaging sensor system is its spatial resolution, i.e., the ability to localize or distinguish objects that are close to one another. In more detail, spatial resolution is the minimum distance between two different objects at which the RADAR system can detect there are two objects as opposed to a single object. Two targets at a given range can be resolved as being separate objects only if they are not within the radar beam at the same time.

Generally, spatial resolution is determined by the frequency (wavelength) of the RADAR signal and the dimensions of the antenna. To improve spatial resolution, one must either increase the frequency of the microwaves or increase the dimensions of the antenna. This is one reason why the RADAR dish antennas at the airport are so large—their large size allows them to resolve two different airplanes in the sky at the same or nearly the same range.

It is typically not practical to provide such large antennas on an airborne platform. However, because airborne platforms such as aircraft, satellites and drones move relative to the surface of the earth, it is possible for backend signal processing to use their smaller moving antennas to "synthesize" larger stationary antennas and thereby achieve higher spatial resolution. In other words, the space swept by the airborne RADAR antenna as the airborne platform moves relative to the earth can be used to increase the effective area or "aperture" of the antenna.

Synthetic Aperture Radar ("SAR") synthesizes a larger antenna by moving a smaller real antenna along a reference path. Generally, the synthesis is carried out by using a computer to coherently combine the backscattered echoes received and recorded along the flight path. The resulting data provides resolution that exceeds the resolution the real antenna could provide if it were stationary instead of moving relative to the target.

Because of its versatility, SAR is often used for the remote sensing of the earth's surface to generate digital terrain models, digital surface models, high resolution imagery, earth surface deformation models and a large diversity of thematic maps. Because SAR is a kind of active microwave RADAR that operates independently of sunlight and cloud coverage, it has become a popular sensing tool that is complementary to platform borne optical sensors that will not operate in fog, cloud cover and/or darkness. See e.g., Franceschetti et al, Synthetic Aperture RADAR Processing (CRC Press 1999).

As discussed above, SAR can be carried by an airborne platform moving relative to the earth's surface. Such platforms include an UAV (unmanned aerial vehicle), an aircraft, a spacecraft or a satellite. An advantage of satellite borne SAR relative to UAV and aircrafts is wider coverage (due to higher altitudes) and the ability to globally revisit portions of the earth surface. Therefore, there is a large set of SAR applications exclusively achieved by satellites.

In more detail, satellite SAR techniques exploit the motion of the radar on board an orbiting satellite to synthesize a long antenna in the flight direction. While the radar is traveling along its path, it is sweeping the radar antenna's footprint across the ground while it is continuously transmitting and receiving radar pulses. In this scenario, every given point in the "radar swath" is imaged many times by the moving radar platform under constantly changing yet predictable observation geometries.

In SAR systems, this change in observation geometry, resulting in a constant change of the distance from the radar to the point on the ground, is precisely encoded in the phase of the observed radar backscatter response. The "phase history" for any point on the ground located at a constant distance parallel to the flight track is the same. By compensating the phase history of each pulse that is affecting a particular point on the ground, it is possible to focus the energy across the long synthetic aperture and create an image of vastly improved resolution.

Through the outlined principles, SAR defeats the intrinsic resolution limits of radar antennas in the along-track direction. In the cross-track or range direction, orthogonal to the satellite path, the resolution is not defined by the antenna beam width, but rather the width of the transmitted pulse. This is because the transmitted pulse intersects the imaged surface as it propagates in the beam. After a two-way trip of a transmitted pulse from sensor to the ground and back, two objects can be distinguished if they are spatially separated by more than half the pulse width. Hence, range resolution is controlled by the transmitted waveform that is generated by the radar and not the size of the antenna footprint on the ground. See e.g., https://nisar.jpl.nasa.gov/technology/sar/.

There are many SAR satellites launched and at least 20 are currently in operation. They can be classified in five classes:

1. SAR with passive flat antenna: this technology was used in the first SAR systems and is still used in few cases. In such systems, the power consumed by the RADAR is much higher than the power supplied by the solar panels, so that large batteries are needed and RADAR operation time must be kept very short, meaning a very short operation duty cycle. The first civil SAR satellite was SEASAT, launched in 1978 by NASA. With a weight of 2 tons, it had only 10 minutes of RADAR operation for each orbit. The estimated system price is US$ 500 million. Other similar SAR satellites, ERS-1 (1991), JERS (1992), ERS-2 (1995) and RADARSAT-1 (1995), worked in C band and had a duty cycle of 10%. The global revisit period of these satellites is more than 5 years.

2. SAR with active flat antenna and a length of more than 8 meters: this kind of system uses a solid state amplifier network connected to its respective antennae and is still the most popular solution. The first civil system called ASAR was launched in 2002 with a weight of more 1 ton, a cost over US$ 500 million, an operation duty cycle of 10% and a global revisit period of 1 year. Other similar satellites are ALOS-1 (2006), ALOS-2 (2014), Sentinel-1A (2014), Sentinel-1B (2014) and SAOCOM (2018).

3. SAR with parabolic reflector antenna having a diameter smaller than 5 m and with a simple feed arrangement: high resolution radar with short imaging swath and low operation duty cycle. The first such satellite launched 20 years ago, with weight of more than 500 kg, a global revisit period longer than 10 years and a cost of more than US$ 100 million. Examples are SARLUPE, TECSAR and RISAT-2.

4. SAR with a parabolic antenna having a diameter larger than 10 m and with a two-dimensional active antennae array feeder: this is the most recent generation radar and is still in development. Radar consumption is smaller than the power of the satellite solar panels and can be operated almost continuously, meaning the operation duty cycle is near 100%. A first satellite will be launched in about 5 years with a weight of more than 1 ton and a cost higher than US$ 500 million. Due to the high operation duty cycle and the use of a digital beamforming antenna, it has a global revisit period of 15 days. Examples are Tandem-L and NISAR. See e.g., https://nisar.jpl.nasa.gov/technology/sar/.

5. SAR with flat antenna and a weight lower than 100 kg: they have a small image swath, low operation duty cycle, a cost lower than US$ 50 million and a global revisit period of several years. The idea is the implementation of a constellation of many satellites. Examples are Capella and Iceye.

Considering the five classes above, the current technology provides the following challenges:
a. There is no SAR satellite capable of a global revisit within 1 month. There are two systems of the 4th class, mentioned above, being developed and shall be launched in the next few years. Moreover they have a high weight, more than 500 kg, and high cost, more than US$ 500 million;
b. Presently there is no technical solution that fulfill the requirements:
   i. Global revisit within 1 month;
   ii. Cost below US$ 10 million;
   iii. Satellite mass lower than 100 kg.

BRIEF DESCRIPTION OF THE DRAWINGS

The following detailed description of exemplary non-limiting illustrative embodiments is to be read in conjunction with the drawings of which.

DETAILED DESCRIPTION OF PREFERRED EMBODIMENTS

Figure 1:
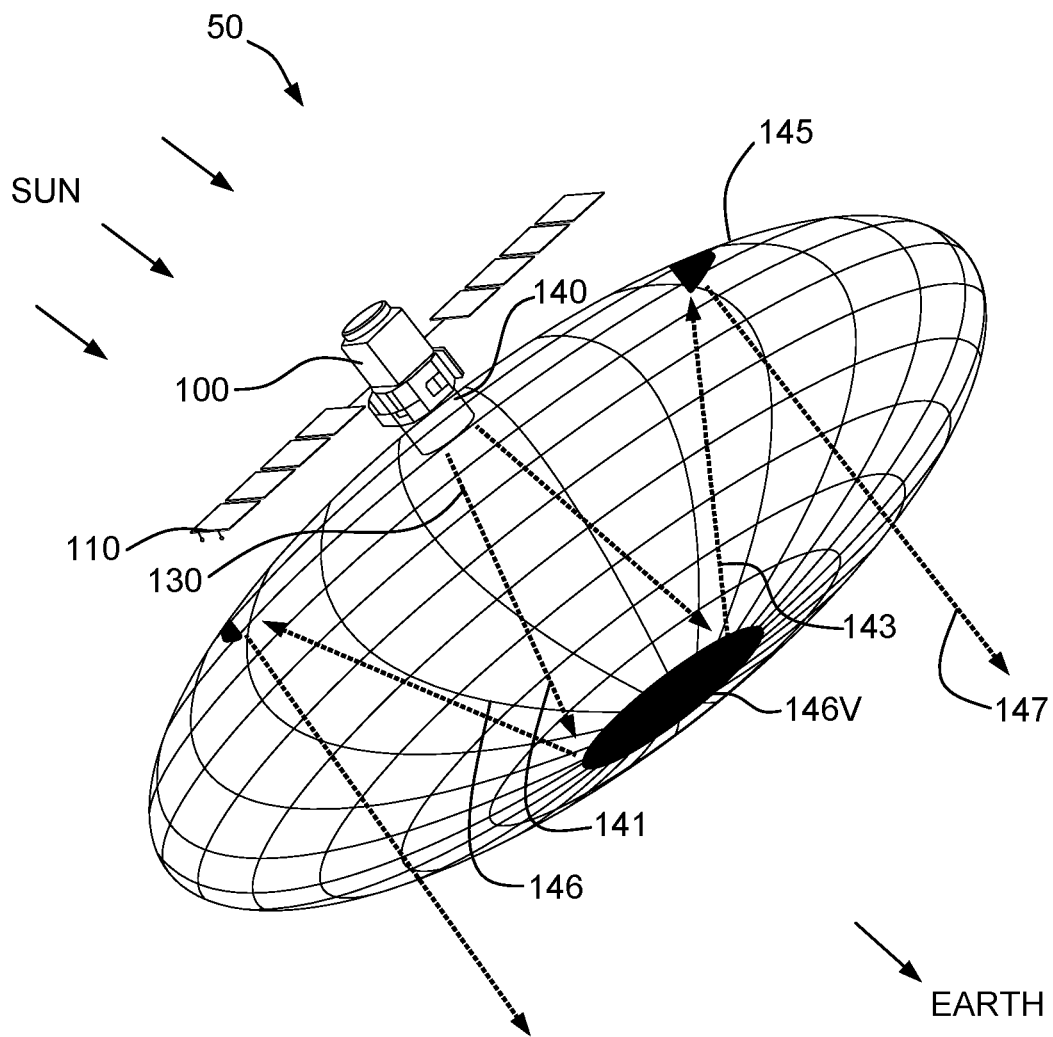
FIG. 1 shows an example non-limiting satellite orbital platform with a synthetic aperture radar (SAR)
Figure 1A:
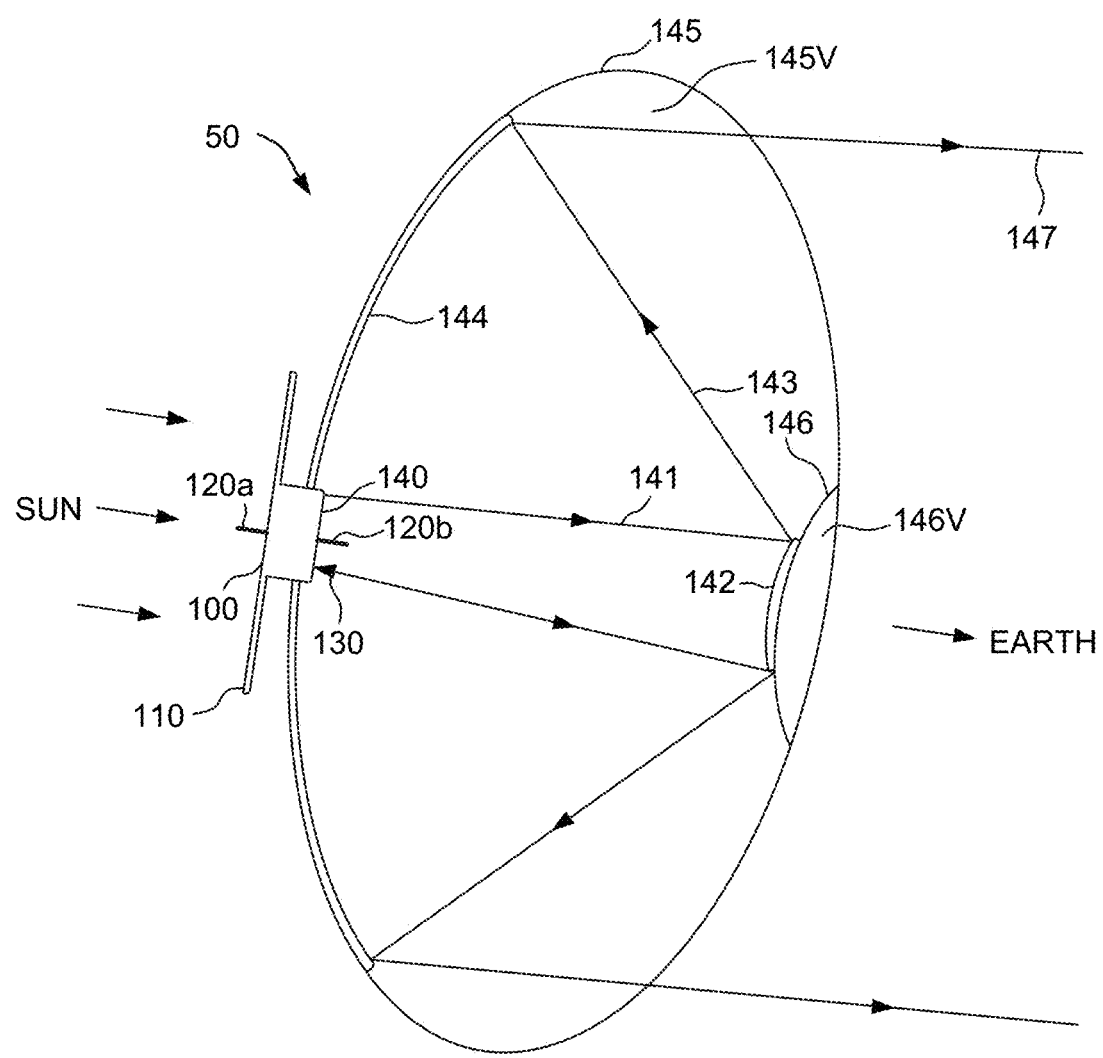
FIG. 1A shows an example non-limiting SAR system and principles of operation.

The example non-limiting technology herein provides a Synthetic Aperture Radar solution on board of a micro-satellite that fulfills the following requirements:
i. Global revisit within 1 month;
ii. Cost below US$ 10 million;
iii. Satellite mass lower than 100 kg.

No other SAR satellite in operation or in construction can fulfill the above mentioned requirements. Moreover, such a solution provides an optimal cost-benefit ratio.

One example non-limiting embodiment provides a micro-satellite in a sun-synchronous orbit with a Cassegrain type antenna with aperture size range between 15 to 30 meters, built of one or more inflatable balloons. Such example non-limiting embodiment has the following characteristics:

1. The use of the micro-satellite and the inflatable Cassegrain antenna allows a total system weight less than 100 kg.

2. The use of an antenna aperture of at least 15 m allows high directivity and reduced radar power consumption. The power generated by solar panels in sun-synchronous dawn-dusk orbit is high enough to continuously feed the radar, providing the capability of an operation duty cycle near 100%.

3. The inflatable Cassegrain antenna with centralized or offset sub-reflector is illuminated by a two-dimensional active antennae array integrated on the body of the satellite. The two-dimensional active antennae array allows electronic antenna beam steering and enlargement of the imaging swath. The wide imaging swath combined with the operation duty cycle near 100% allows, in turn, global revisits at reduced intervals such as down to 1 month. The image resolution, accuracy and quality are similar to the existing systems and can be used to deliver the same set of products existent on the market, but the example non-limiting embodiment provides much lower cost and weight.

4. The micro-satellite has an additional set of antennae for telemetry and an antenna for radar data down link in real time to the ground station.

5. The technical solution presented in the above points 1 to 4 has a cost lower than US$ 10 million.

This solution, using L band around 1.2 GHz, is ideal for carrying out applications such as:
a. continuous monitoring for deforestation, subsidence, agriculture, inundation, oil slick on ocean, ice movement and ocean waves;
b. Amazon Forest monitoring, fulfilling the requirements of "PRODES", 10 m resolution and 1 month revisit, and "DETER", 30 m resolution and 1 week revisit, of the Brazilian Government.

In more detail, example non-limiting embodiments of a satellite borne Synthetic Aperture Radar for surveying the earth's surface comprise a Cassegrain type antenna with physical aperture size in a range between 15 to 30 meters, comprising inflatable balloons with a controlled pressure during orbit providing an antenna geometry for radar wavelengths larger than millimeters. The Cassegrain type antenna comprises a two-dimensional active antenna array enabling electronic beam steering in elevation and azimuth directions. The Cassegrain type antenna comprises a sub-reflector that is centralized or offset for defining an illumination pattern on the earth's surface. A Power, Attitude and Orbit Control Subsystem comprises a telemetry infrastructure and a real-time data down link enabling the satellite to be controlled by a satellite control center and to download acquired radar data to a ground station.

The inflatable Cassegrain type antenna has a large diameter enabling a very low transmission power and a total radar power consumption less than 100 W. The large diameter and very low transmission power simplifies the radar and satellite electronic and mechanical design, presenting a total satellite mass of less than 100 kg including the weight of the inflatable Cassegrain type antenna.

The Cassegrain type antenna is configured so that the illumination beam of the Cassegrain type antenna is electronically steerable on the earth's surface, so that an imaging swath width in the range up to several hundreds of kilometers can be reached by an orbit of around 500 km, achieving a global revisit time of 1 month with 10 meter resolution. Global revisit time of one week is achieved by a constellation of 2 satellites with a resolution of 30 meters; and lower than one week and/or resolutions better than 10 m by a satellite constellation of more than 2 satellites.

Example Non-Limiting Embodiment

Figure 2:
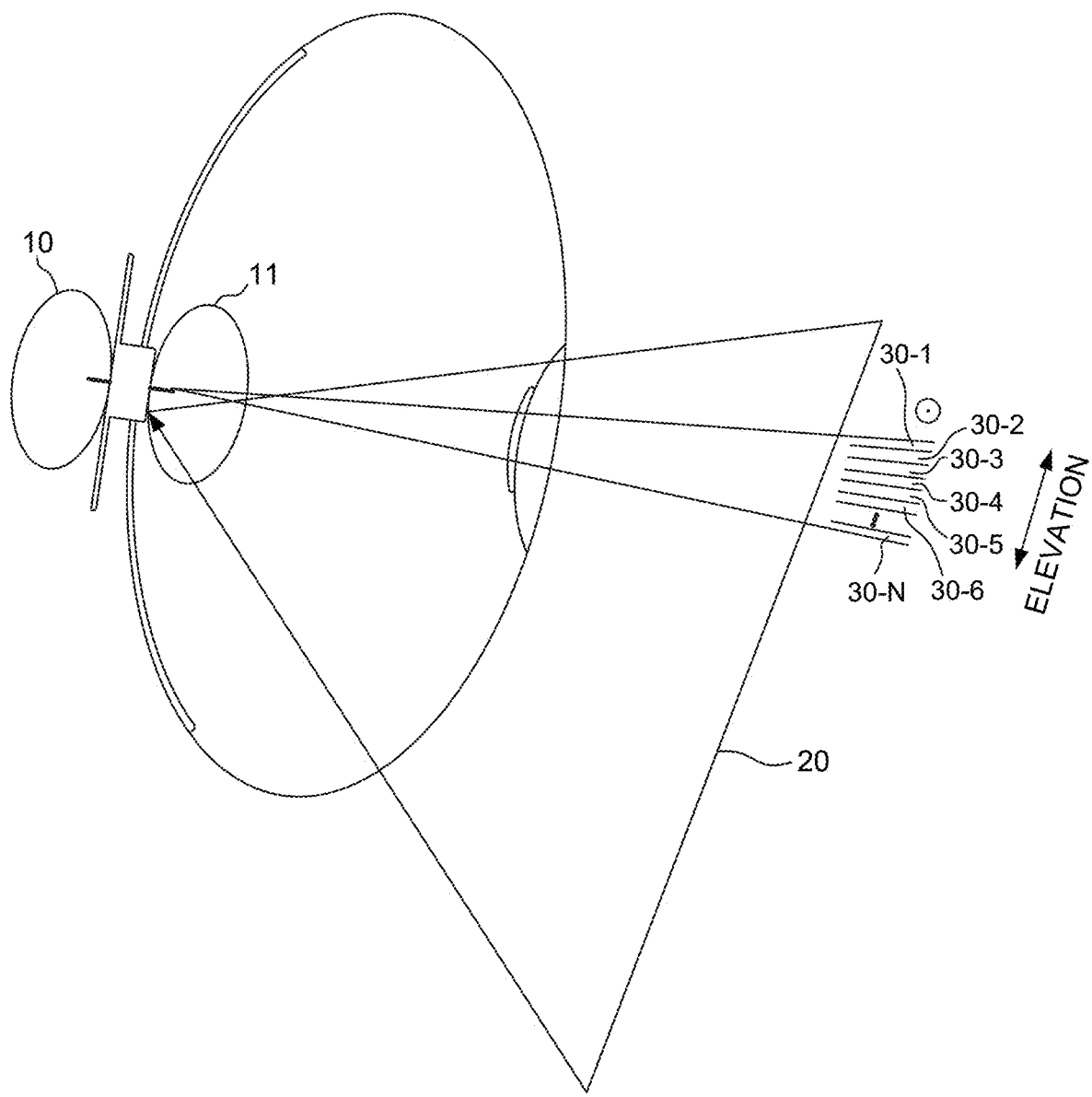
FIG. 2 shows example non-limiting antenna lobes of the satellite.
Figure 3:
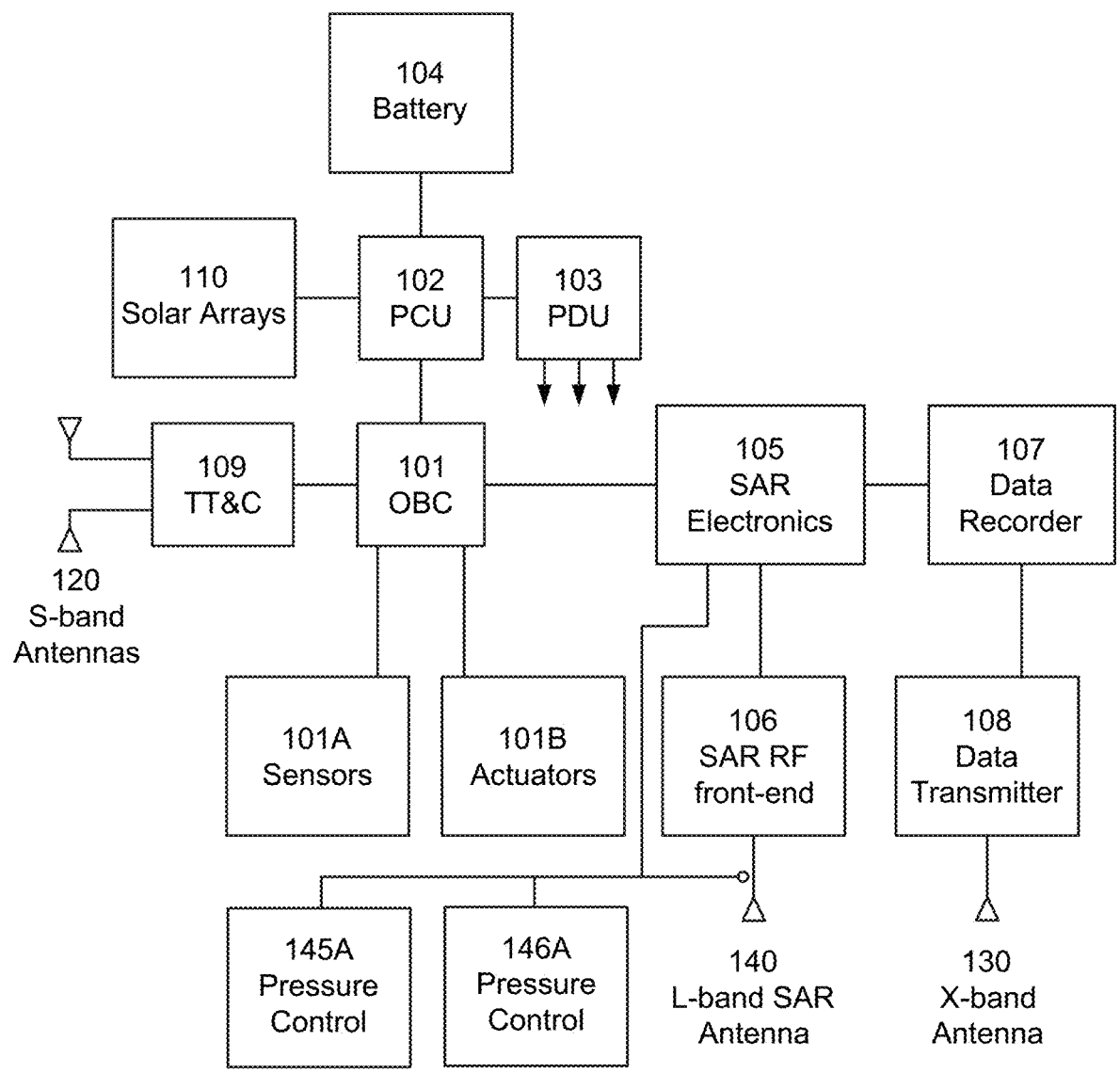
FIG. 3 shows a block diagram of example non-limiting satellite systems supporting SAR.

An example non-limiting SAR satellite (50) is shown in the FIGS. 1, 2 and 3.

FIG. 1 shows example non-limiting principles of operation and can be described as follows:

The satellite (50) includes: a body or housing (100) which includes internal parts (not shown) and may have the following external parts: solar panels (110), telemetry antennae (120), data down-link to ground station (130) and radar antennae components (140, 142, 144, 145 and 146).

The subsystems of the satellite (50) and of the radar are located in the body of the satellite (100). The satellite (50) has a sun-synchronous dawn-dusk orbit—local time of a descending node (i.e., when the satellite is traveling from north to south over the Earth's surface) may be for example 6 h or 18 h. In this kind of orbit, during most of the year, the satellite orbit is in sunlight during the entirety of its orbit. The solar panels (110) are therefore continuously illuminated from the sun and supply enough power for all satellite and radar subsystems in nominal operation mode. The solar panels (110) may start out folded and stay folded in the launching vehicle and are unfolded as soon as the satellite is in controlled orbit.

The telemetry antenna(s) (120) operates in the S band and may comprise two antennae (120a, 120b) placed in two faces of the satellite body (100), so that at least one telemetry antenna always has direct view to the ground station irrespective of the orientation of the satellite (50) relative to the ground station.

The down-link antenna (130) may operate in the X band or higher and sends the radar data in real time to the ground station with at least 100 Mbit/s, depending on the resolution and swath width of the radar.

In one example non-limiting embodiment, the Cassegrain type antenna comprises a two-dimensional active antenna array enabling electronic beam steering in elevation and/or azimuth directions, and includes a sub-reflector that is centralized or offset for defining an illumination pattern on the earth's surface. In more detail, the SAR system in one embodiment includes a two-dimensional active antenna phased array 140. Such an active antenna phased array 140 may comprise for example a number K of patch antennas and/or waveguide antennas arranged in a two-dimensional (e.g., rectangular, circular, etc.) array. Each such antenna in the array is electrically coupled to a controllable phase element. The controllable phase elements are controlled to select appropriate relative phase delays for the various patch or waveguide antennas, thereby forming a beam and steering the beam the antenna array emits. See e.g., Xu et al, "A Compact Ku-Band Active Electronically Steerable Antenna with Low-Cost 3D T/R Module" Wireless Communications and Mobile Computing, Volume 2019, Article ID 5287679, https://doi.org/10.1155/2019/5287679.

The phased array 140 generates a transmission and reception lobe (141) that is electronically steered in both elevation and azimuth (see FIG. 2). The phased array 140 steers the lobe (141) toward the sub-reflector where it is reflected by the sub-reflector (142) to provide a further resulting lobe (143) pointed to the main reflector (144). Electronic steering of array 140 within a range thus defines the shape and direction of the illumination pattern the main reflector 144 emits towards the target. The main reflector (144) points and directs the resulting lobe (147) to the earth's surface.

In one example embodiment, the Cassegrain type antenna has a real aperture size in a range between 15 to 30 meters and comprises inflatable balloons with a controlled pressure during orbit providing an antenna geometry for radar wavelengths larger than millimeters. In one embodiment, the inflatable Cassegrain type antenna has a large diameter enabling a very low transmission power and a total radar power consumption less than 100 W. The large effective antenna diameter and very low transmission power simplifies the radar and the satellite's electronic and mechanical design, presenting a total satellite mass of less than 100 kg including the weight of the inflatable Cassegrain type antenna.

The sub-reflector (142) can be centralized, as shown in FIG. 1, or can be placed with an offset, depending on the illumination requirements of the radar. These two options shall be considered in the antennae design and depends on the imaging requirements of the radar.

In one example non-limiting embodiment, the Cassegrain antenna is mechanically constructed of two cavities (145V and 146V), limited by the surfaces (145) and (146) respectively. The larger cavity (145V) defines the shape of the main reflector (147) and the smaller cavity (146V) defines the shape of the sub-reflector (142). As mentioned before, the sub-reflector (142) can be centralized or offset. The main reflector 144 of the Cassegrain antenna is inflated as soon as the satellite is in controlled orbit and remains inflated during its entire operation life. An inflation pressure control guarantees the correct geometry of the reflectors (147) and (142). See e.g., Chandra, "Inflatable Parabolic Reflectors for Small Satellite Communication", Masters Thesis, Arizona State University (December 2015). An independent pressure control system (145A and 146A) for each cavity (145V and 146V) controls the shape and guarantees the correct geometry of the reflectors (147) and (142). The pressure control system can be used to modify the illumination beam gain and beamwidth.

The example non-limiting satellite further includes a Power, Attitude and Orbit Control Subsystem comprising a telemetry infrastructure and a real-time data down link enabling the satellite to be controlled by a satellite control center and to download acquired radar data to a ground station. The radar can be controlled to operate continuously. Depending on the application (e.g., satellite dimensions and altitude), its swath width on the ground can vary between 80 km and 300 km. The illumination of the swath is realized by electronic beam steering in azimuth and elevation through a two-dimensional active antennae array of the radar. The transmission signal can be generated by an electronic tube or by solid state devices.

The backscattered signal from the earth's surface is amplified, pre-processed, encoded, modulated and transmitted to the ground station via the down-link antenna (120). The ground station receives the radar data from the down-link antenna (120), carries out a second processing phase and sends the further processed data to the next (defined) station for storage, imaging, etc. A network of ground stations connected via the Internet or other means is used to store and forward such received radar data.

Revisit time (RT) of a single satellite is the time elapsed between two successive observations of the same ground point on the surface of the Earth. See e.g., Luo, "A Novel Technique to Compute the Revisit Time of Satellites and Its Application in Remote Sensing Satellite Optimization Design" International Journal of Aerospace Engineering Volume 2017, Article ID 6469439, 9 pages, https://doi.org/10.1155/2017/6469439.

The example non-limiting Cassegrain type antenna of FIG. 1 is configured so that its illumination beam is electronically steerable on the earth's surface. Such electronic steering enables an imaging swath width in the range up to several hundreds of kilometers to be reached by an orbit of around 500 km, achieving a global revisit time of 1 month with 10 meter resolution. Global revisit time of one week is achieved by a constellation of 2 satellites with a resolution of 30 meters. Global revisit time lower than one week and/or resolutions better than 10 m can be reached by a satellite constellation of more than 2 satellites.

FIG. 2 presents example non-limiting antenna lobes (RF radiation pattern) produced by the satellite. The radiation patterns the satellite defines can be described as follows:

The telemetry antennae (120) provides an omnidirectional radiation pattern, where the lobes are represented by (10), in an opposite direction to the earth, and by (11), in the same direction as the earth, in the case of nominal operation of the satellite. The down-link antenna (130) presents the lobe (20), illuminating the earth's surface with a beam width of tens of degrees in the flight direction of the orbit. A common beam width is 60 degrees, allowing an acceptable number of ground stations for contiguous radar data reception.

The radar antenna presents N sub-beams, numbered from (30-1) to (30-N), in elevation. Typical values for N are: 8 for illuminating a swath width of 80 km and 32 sub-beams for illuminating a swath width of 320 km (each sub-beam in this case is 10 km wide). Selection of elevation sub-beams can be performed by beam steering as discussed above. In an azimuthal flight direction of the orbit, the antenna may present M beams. In some example embodiments, M=2.

FIG. 3 presents a block diagram of example non-limiting structures making up the satellite. Its functionality can be described as follows:

The SAR payload comprises the inflatable Cassegrain antenna with feed array (140), an RF front-end unit (106), SAR electronics (105), a data recorder (107), a X-band transmitter (108) and an X-band antenna (130).

Pressure control systems (145A) and (146A) are used to inflate the antenna cavities (145V) and (146V) and control the shapes of the reflector (144) and subreflector (142) respectively;

The payload data transmission in the X-band is via the X-band antenna. The X-band satellite antenna (130) has a large beam beamwidth to maximize the contact time between the satellite and the earth station(s). The link uses an adaptive modulation and coding scheme, such as DVB-S2, to increase efficiency. With a 5 W RF transmitter transmitting to a 5 m receiving antenna on the ground, an average data rate of 150 Mbps is achieved during the satellite pass. Multiple spaced-apart ground stations are provided to continually receive satellite transmission downloads as the satellite sweeps over the earth's surface.

The satellite (50) platform comprises a Power subsystem (102, 103 and 104, 110), a telemetry, tracking and command (TT&C) subsystem (109), an on-board computer (OBC) (101), attitude control sensors (101A) and actuators (101B). The power subsystem comprises solar arrays (110), batteries (104), electronic power conditioner (PCU) (102) and power distribution unit (PDU) (103). The TT&C subsystem 109 comprises two antennas (120) (in opposite sides of the satellite to provide an omnidirectional coverage) and a transponder (109). In example non-limiting embodiments, the subsystem is compatible with CCSDS standards and will be in the S-band.

The on board computer OBC (101) is where the OBDH (Onboard Data Handling) and AOCS (Attitude and Orbit Control Subsystem) software stored in non-transitory memory executes. The sensors (101A) used in the AOCS may be star (celestial navigation) trackers, magnetometers and GPS. The actuators (101B) may be reaction wheels, magnetotorquers and thrusters.

Example non-limiting embodiments allow the following surveying and satellite characteristics, which are not reachable by existing satellite technologies with a cost under US$ 10 million and a weight lower than 100 kg:

| Mode:<br>Revisit Period/<br>Image Resolution | Number of satellites | SAR average Power consumption (W) | Radar Antennae Diameter (m) |
|---|---|---|---|
| 1 month/30 m | 2 | 40 | 15 |
| 1 month/10 m | 2 | 80 | 15 |
| 1 week/30 m (DETER, 1st option) | 8 | 40 | 15 |
| 1 month/10 m (PRODES) | 1 | 80 | 30 |
| 1 week/30 m (DETER, 2nd option) | 2 | 40 | 30 |
| 1 month/30 m | 1 | 40 | 30 |

Example Non-Limiting Advantages Related to the State of the Art

The example non-limiting embodiments herein provide a micro-satellite borne SAR with a:
 i. Global revisit within 1 month;
 ii. Cost below US$ 10 million;
 iii. Satellite mass lower than 100 kg.

Example non-limiting embodiments have the capabilities to become an important tool for continuous monitoring of:
 a. the Amazon Forest deforestation; and
 b. the subsidence of dams, pipelines and hilly area close to urban areas.

There is no current SAR satellite capable of a global revisit within 1 month. There are technical solutions with a global revisit time within 1 month but they have a weight of more than 500 kg and high cost of more than US$ 500 million.

The solution presented is a unique compact version with short global revisit time available.

All publications cited above are expressly incorporated herein by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A satellite borne Synthetic Aperture Radar (SAR) for surveying the earth's surface, comprising:
a geometrically-adjustable Cassegrain type antenna with aperture size in a range between 15 to 30 meters, comprising an inflatable balloon with a controlled pressure during orbit providing, during orbit, adjustable antenna geometry and characteristics for radar wavelengths larger than millimeters,
the geometrically-adjustable Cassegrain type antenna comprising a two-dimensional active antenna array enabling electronic beam steering in elevation and azimuth directions with in-orbit adjustable electronic beam steering range,
the Cassegrain type antenna comprising a sub-reflector that is centralized or offset for defining an illumination pattern on earth's surface with in-orbit adjustable geometry; and
a Power, Attitude and Orbit Control Subsystem comprising a pressure control of geometrically-adjustable Cassegrain antenna reflectors, a telemetry infrastructure and a real-time data down link enabling the satellite to be controlled by a satellite control center and to download acquired radar data to a ground station.

2. The satellite borne SAR as claimed in claim 1, wherein the gain and beamwidth of the illumination beam of the geometrically adjustable inflatable Cassegrain type antenna can be modified in orbit by changing the shape of the main and secondary reflectors, wherein independent pressure control of first and second cavities are used to control the shapes of the main and secondary cavities to modify the antenna characteristics.

3. The satellite borne Synthetic Aperture Radar as claimed in claim 1, wherein the geometrically adjustable inflatable Cassegrain type antenna has a large diameter enabling a transmission power lower than 100 watts, a total radar power consumption less than 100 W, and a total satellite weight less than 100 kilograms.

4. The satellite borne Synthetic Aperture Radar as claimed in claim 1, wherein the geometrically adjustable inflatable Cassegrain type antenna is configured so that the illumination beam of the Cassegrain type antenna is electronically steerable on the earth's surface, so that an imaging swath width in the range up to several hundreds of kilometers can be reached by an orbit of around 500 km, achieving a global revisit time of 1 month with 10 meter resolution, wherein localization of the imaging swath of the earth's surface can vary beyond elevation and azimuth steering deflection limits by geometrically adjusting the geometry of the main and sub-reflectors of the inflatable Cassegrain antenna by respective pressure controls.

5. The satellite borne Synthetic Aperture Radar as claimed in claim 4, wherein Global revisit time of one week is achieved by a constellation of 2 satellites with a resolution of 30 meters.

6. The satellite borne Synthetic Aperture Radar as claimed in claim 4, wherein Global revisit time lower than one week and/or resolutions better than 10 m can be reached by a satellite constellation of more than 2 satellites.

7. The satellite borne Synthetic Aperture Radar (SAR) of claim 1 wherein the pressure control modifies the illumination beam gain and/or beamwidth provided by the geometrically-adjustable Cassegrain antenna reflectors.

8. The satellite borne Synthetic Aperture Radar (SAR) of claim 1 wherein the pressure control provides a controllable amount of inflation that defines the geometry of the two-dimensional active antenna array and thereby focusses the RF radiation beam pattern of the array.

9. An orbital platform comprising:
a housing;
a SAR radar system comprising an inflatable geometrically adjustable Cassegrain antenna mounted to the housing, the antenna comprising a two-dimensional steerable active antenna array, a sub-reflector and a main reflector, the antenna array emitting microwave pulses that the sub-reflector reflects to the main reflector and the main reflector reflects to the target; and
solar panels mounted to the housing;
wherein the solar panels provide sufficient energy to enable substantially continuous operation of the SAR radar system.

10. The orbital platform of claim 9 wherein the SAR radar system consumes less than 100 watts.

11. The orbital platform of claim 9 wherein the orbital platform has a total mass of less than 100 kg.

12. The orbital platform of claim 9 wherein the SAR radar system achieves a global revisit time of 1 month with 10 meter resolution; one week when operating in a constellation of two satellites with a resolution of 30 meters; and less than one week and/or resolution better than 10 meters when operating in a constellation of more than two satellites.

13. An orbital platform comprising:
a housing;
a SAR radar system comprising an inflatable Cassegrain antenna mounted to the housing, the antenna comprising a two-dimensional steerable active antenna array, a sub-reflector and a reflector, the antenna array emitting microwave pulses that the sub-reflector reflects to the reflector and the reflector reflects to the target; and
solar panels mounted to the housing;
wherein the solar panels provide sufficient energy to enable substantially continuous operation of the SAR radar system,
wherein the gain and beamwidth of the illumination beam of the inflatable Cassegrain type antenna can be modified in orbit by changing the shape of the main and secondary reflectors, wherein independent pressure control of first and second the cavities are used to control the shapes of the main and secondary cavities to modify the antenna characteristics.

* * * * *